(12) United States Patent
Gorman et al.

(10) Patent No.: US 6,871,126 B2
(45) Date of Patent: Mar. 22, 2005

(54) VARIABLE BLOWER CONTROLLER FOR VEHICLE

(75) Inventors: Brian A. Gorman, Burton, MI (US); Sacha E. Barnes, Grand Blanc, MI (US); John T. Wichlacz, Davison, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/427,155

(22) Filed: Apr. 30, 2003

(65) Prior Publication Data

US 2004/0107029 A1 Jun. 3, 2004

Related U.S. Application Data

(60) Provisional application No. 60/377,560, filed on May 3, 2002.

(51) Int. Cl.[7] .................................................. G06F 7/00
(52) U.S. Cl. ......................................... 701/36; 165/202
(58) Field of Search ........................... 701/36; 237/2 A, 237/12.3 A, 12.3 B; 165/202; 454/69

(56) References Cited

U.S. PATENT DOCUMENTS

| | | | |
|---|---|---|---|
| 4,002,959 A | 1/1977 | Schadlich et al. | 318/245 |
| 4,389,990 A | 6/1983 | Murray | 123/353 |
| 4,418,298 A | 11/1983 | Suzuki et al. | 318/341 |
| 4,427,931 A | 1/1984 | Tsukihashi | 318/317 |
| 4,481,448 A | 11/1984 | Bishop | 318/248 |
| 4,511,829 A | 4/1985 | Wisniewski | 318/317 |
| 4,523,134 A | 6/1985 | Kinoshita et al. | 318/313 |
| 4,562,393 A | 12/1985 | Loyzim et al. | 318/599 |
| 4,583,028 A | 4/1986 | Angersbach et al. | 318/254 |
| 4,626,962 A | 12/1986 | Ahn et al. | 361/399 |
| 4,665,350 A | 5/1987 | Angi et al. | 318/254 |
| 4,749,922 A | 6/1988 | Hoppe et al. | 318/257 |

(List continued on next page.)

*Primary Examiner*—Thomas G. Black
*Assistant Examiner*—Christine M. Behncke
(74) *Attorney, Agent, or Firm*—Van Dyke, Gardner, Linn & Burkhart, LLP

(57) ABSTRACT

A variable blower controller for controlling the blower speed of a climate control system of a vehicle includes a microprocessor which is operable to variably control the blower speed of a blower motor of the climate control system. The variable blower controller provides for smart power management of the blower to avoid high-power dissipative modes when system temperatures are above "safe" levels. The smart power management objective is met by keeping the field effect transistor junction temperature away from design limits or threshold levels where possible. The microprocessor utilizes software and may use a combination of inputs to calculate these levels.

13 Claims, 1 Drawing Sheet

U.S. PATENT DOCUMENTS

| | | | |
|---|---|---|---|
| 4,803,410 A | 2/1989 | Shinohara et al. | 318/331 |
| 4,893,067 A | 1/1990 | Bhagwat et al. | 388/817 |
| 4,893,215 A | 1/1990 | Urushiwara et al. | 361/395 |
| 4,899,256 A | 2/1990 | Sway-Tin | 361/386 |
| 4,999,556 A | 3/1991 | Masters | 318/599 |
| 5,070,267 A * | 12/1991 | Sano et al. | 310/89 |
| 5,230,035 A | 7/1993 | Spring | 388/815 |
| 5,285,146 A | 2/1994 | Pierret et al. | 322/25 |
| 5,329,238 A | 7/1994 | Hofsass et al. | 324/522 |
| 5,363,024 A | 11/1994 | Hiratsuka et al. | 318/254 |
| 5,521,785 A | 5/1996 | Schmidt et al. | 361/720 |
| 5,594,307 A | 1/1997 | Adachi et al. | 318/280 |
| 5,747,956 A | 5/1998 | Lamm | 318/599 |
| 5,781,385 A | 7/1998 | Permuy | 361/30 |
| 5,799,869 A * | 9/1998 | Pichotta | 237/8 A |
| 5,917,296 A | 6/1999 | Frey et al. | 318/268 |
| 6,018,234 A | 1/2000 | de Savasse | 322/33 |
| 6,054,198 A | 4/2000 | Bunyan et al. | 428/40.5 |
| 6,064,931 A | 5/2000 | Sawada et al. | 701/41 |
| 6,180,880 B1 | 1/2001 | Loibl et al. | 174/52.3 |
| 6,201,366 B1 | 3/2001 | Menegoli | 318/590 |
| 6,281,827 B1 | 8/2001 | Hsieh | 341/152 |
| 6,329,785 B1 * | 12/2001 | Starkie et al. | 318/811 |
| 6,404,607 B1 | 6/2002 | Burgess et al. | 361/58 |
| 6,587,338 B2 | 7/2003 | LaCroix et al. | 361/688 |
| 2002/0066281 A1 * | 6/2002 | Gunasekera | 62/186 |
| 2002/0150478 A1 * | 10/2002 | Aoki | 417/44.1 |
| 2003/0057899 A1 | 3/2003 | LaCroix | 318/114 |
| 2003/0063900 A1 | 4/2003 | Wang et al. | 388/806 |
| 2003/0123224 A1 | 7/2003 | LaCroix et al. | 361/688 |

* cited by examiner

VARIABLE BLOWER CONTROLLER FOR VEHICLE

CROSS REFERENCE TO RELATED APPLICATION

The present application claims priority of U.S. provisional application, Ser. No. 60/377,560, filed May 3, 2002, which is hereby incorporated herein by reference in its entirety.

FIELD OF THE INVENTION

The present invention is related to a blower controller for a blower motor for use in vehicle applications and, more particularly, to a blower controller having a field effect transistor.

BACKGROUND OF THE INVENTION

Early vehicle climate control systems utilized resistor cards to provide discrete blower speeds for manual adjustment. These resistor cards introduced different resistances in line with the blower motor to set motor current. To cool the resistor card, the part was typically placed in the air stream of the blower system.

Innovation led to the use of "linear" devices based on circuits using a power bipolar junction transistor (BJT) in combination with a relay to achieve high blower speed. These devices were more adjustable than the resistor cards, but the requirement to dissipate the required power in linear mode mandated the use of large, heavy, and costly heat sinks. These devices typically received a signal from a control head and adjusted their outputs without regard to changing battery voltages or motor stall.

Other variable blower control designs have implemented the use of field effect transistor (FET) devices in lieu of the power BJT and relay. This is possible due to the low drain-source resistances available in the FET devices. However, the power requirements in the mid-blower speeds continue to require a large heat sink to dissipate the power. Variations to combat this shortcoming have included variable blower controllers with a pulse width modulated (PWM) output. Such controllers allow for a much smaller heat-sink. However, the switching of the controller has introduced a new problem of noise for the blower controller.

SUMMARY OF THE INVENTION

The present invention is intended to provide an improved microprocessor-based variable blower controller for use in a vehicle including smart power management or intelligent power management. The variable blower controller employs the functionality of an on-board microprocessor to achieve greater control of output voltage, more robust motor protection strategies, and wider-applicability for extreme vehicle conditions.

According to an aspect of the present invention, a microprocessor-based variable blower controller for use in a climate control system of a vehicle includes a field effect transistor, a temperature sensor in proximity to the field effect transistor, and a microprocessor. The temperature sensor is operable to sense a temperature and generate a temperature signal indicative of the temperature. The microprocessor is operable to control a blower motor of the climate control system of the vehicle via a pulse width modulation output of the microprocessor. The microprocessor receives the temperature signal from the temperature sensor, and is operable to adjust the pulse width modulation output in response to the temperature signal.

The microprocessor may receive at least one input indicative of high and low side voltages of the blower motor and a current through or applied to the blower motor. The microprocessor may be operable to adjust the pulse width modulation output in response to the at least one input. Optionally, the microprocessor may be operable to adjust the pulse width modulation output in response to a combination of at least two inputs reaching a threshold level.

The microprocessor may be operable to compare the at least one input to actual and expected output voltages, and may be operable to detect over-current conditions in response to the at least one input indicative of current. The microprocessor may be operable to deactivate the blower motor in response to a detection of an over-current condition. The pulse-width modulation output of the microprocessor may be converted to a linear output voltage across the motor.

The variable blower controller with smart or intelligent power management uses a field effect transistor (FET) design, and includes a microprocessor, which receives feedback on motor current, battery voltage, and/or device temperature. The microprocessor may adjust an output in response to the feedback. Therefore, the variable blower controller of the present invention has the ability to give a number of additional functions/benefits, such as smart power management, tighter output performance, flexible output performance, dynamic current limiting/enhanced motor protection, and/or the like.

These and other objects, advantages, purposes and features of the present invention will become apparent upon review of the following specification in conjunction with the drawing.

DESCRIPTION OF THE PREFERRED EMBODIMENTS

Figure 1:
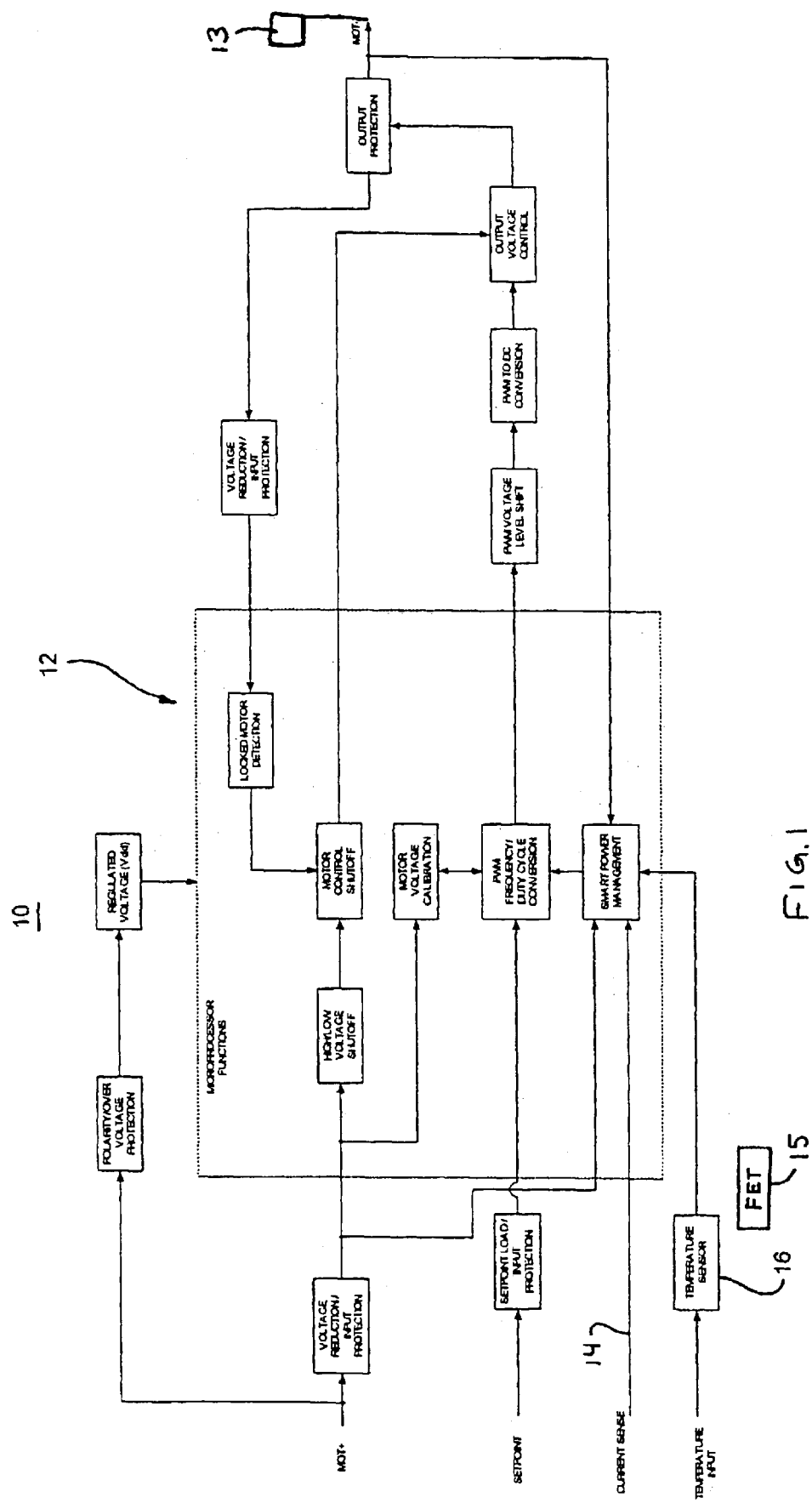
FIG. 1 is a block diagram of a variable blower controller in accordance with the present invention.

Referring now to the drawing and the illustrative embodiments depicted therein, a variable blower controller 10 for controlling the blower speed of a heating, ventilation and/or air conditioning system or climate control system of a vehicle includes a microprocessor 12 which is operable to variably control the blower speed of a blower motor 13 of the heating, ventilation and/or air conditioning system or climate control system of the vehicle (FIG. 1).

The variable blower controller of the present invention provides for smart power management or intelligent power management of the blower. Smart or intelligent power management refers to the controller making an intelligent decision to avoid high-power dissipative modes when system temperatures are above "safe" levels. The smart power management objective is met by keeping a field effect transistor (FET) 15 junction temperature away from design limits or threshold levels where possible. The microprocessor utilizes software and a combination of inputs to calculate these threshold levels or limits.

The microprocessor 12 is operable to control and/or adjust a pulse width modulation (PWM) output in response to inputs to the microprocessor. The PWM output may be converted to a DC voltage such that a generally linear output voltage may be applied across the motor. An output voltage control function may further control the voltage applied across the motor, such a via providing a motor control shutoff function, such as in response to a locked motor detection or a high/low voltage shutoff detection or signal.

The inputs to the microprocessor 12 may include high and low side voltages of the motor, current 14 applied to or through the motor, and a voltage output or output signal of a temperature sensor 16 in close proximity to the power field effect transistor 15. When either of these inputs or a combination of these inputs reaches a certain threshold level or levels, the microprocessor may alter the PWM output and force the blower motor to work in a safe mode of operation. For example, the microprocessor may reduce the operating load or mode of the motor in response to the sensed temperature being greater than or equal to a threshold temperature. The microprocessor and variable blower controller of the present invention may still allow the blower to operate in high and low defrost conditions, and may allow the blower to operate in these conditions irrespective of the temperature signal or other input or inputs. The smart power management of the blower controller of the present invention thus may slow the motor or reduce the load on the motor before the motor heats to an unsafe level, and thus allows for a smaller heat sink, which may lead to lower weight and cost of the blower controller. The smart power management of the present invention may thus provide an extended life for a blower controller of similar size and power requirements.

The variable blower controller of the present invention provides a tighter output performance of the controller. The controller employs a close-loop feedback of signals from the battery or power source and the device output to maintain a generally constant motor voltage. The microprocessor-based design of the present invention may require less circuitry than its analog counterpart, which may translate to a lower cost part and a smaller package size.

The variable blower controller of the present invention may also provide for flexible output performance of the blower motor. The microprocessor of the blower controller of the present invention may retain the performance curve in memory. The performance curve may dictate the input-to-output transfer function. Analog designs are typically limited and often require major design alterations to accommodate a change in performance. The variable blower controller of the present invention can redefine, with precision, its output performance curve to accommodate desired functions, which may be linear functions, higher-order polynomial functions, piece-wise combination functions, or the like. Because the performance is software driven, the cost and time to implement such changes are minimal.

The variable blower controller of the present invention may also provide for dynamic current limiting and/or enhanced motor protection. The microprocessor may use current sensing and may compare the sensed current with the actual and expected output voltages to detect over-current conditions. This comparison allows a limit to be set dependent on the motor speed setting. Upon detection of an over-current scenario (such as stall), the controller can take action to shut off the motor output, thus protecting the motor and the controller from damage. The dynamic limit allows for a tighter threshold setting for the stall detection and introduces the possibility of partial stall detection.

Therefore, the present invention provides a variable blower controller for a heating, ventilation and/or air conditioning system or climate control system of a vehicle which includes a microprocessor for controlling the blower in response to various inputs. The microprocessor is operable to maintain the blower motor at an appropriate operating level and temperature, so that the field effect transistor does not exceed a threshold temperature. The microprocessor may be further operable to adjust an output performance of the controller to provide for flexible output performance of the climate control system. Because the variable blower controller of the present invention is microprocessor-based, the adjustments of the output may be quickly and inexpensively obtained.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A microprocessor-based variable blower controller for use in a climate control system of a vehicle comprising:

a field effect transistor;

a temperature sensor in proximity to said field effect transistor and operable to sense a temperature indicative of the temperature of said field effect transistor and generate a temperature signal indicative of the temperature of said effect transistor; and a microprocessor operable to control a blower motor of the climate control system of the vehicle via a pulse width modulation output of said microprocessor, said microprocessor receiving said temperature signal from said temperature sensor, said microprocessor being operable to adjust said pulse width modulation output in response to said temperature signal indicative of the temperature of said effect transistor.

2. The microprocessor-based variable blower controller of claim 1, wherein said microprocessor receives at least one input indicative of high and low side voltages of the blower motor and a current applied to the blower motor, said microprocessor being operable to adjust said pulse width modulation output in response to said at least one input.

3. The microprocessor-based variable blower controller of claim 2, wherein said microprocessor is operable to adjust said pulse width modulation output in response to a combination of at least two inputs reaching a threshold level.

4. The microprocessor-based variable blower controller of claim 2, wherein said at least one input is indicative of current applied to said blower motor.

5. The microprocessor-based variable blower controller of claim 4, wherein said microprocessor compares said at least one input to actual and expected output voltages, said microprocessor being operable to detect an over-current condition in response to said at least one input indicative of current.

6. The microprocessor-based variable blower controller of claim 5, wherein said microprocessor is operable to deactivate the blower motor in response to a detection of said over-current condition.

7. The microprocessor-based variable blower controller of claim 1, wherein said microprocessor is operable to adjust said pulse width modulation output in response to said temperature signal being indicative of a temperature greater than or approximately equal to a threshold temperature.

8. The microprocessor-based variable blower controller of claim 1, wherein said pulse-width modulation output of said microprocessor is converted to a linear output voltage across the motor.

9. A microprocessor-based variable blower controller for use in a climate control system of a vehicle comprising:
- a field effect transistor;
- a temperature sensor in proximity to said field effect transistor and operable to sense a temperature and generate a temperature signal indicative of the temperature; and
- a microprocessor operable to control a blower motor of the climate control system of the vehicle via a pulse width modulation output of said microprocessor, said microprocessor receiving said temperature signal from said temperature sensor, said microprocessor being operable to adjust said pulse width modulation output in response to said temperature signal, said microprocessor being operable to adjust said pulse width modulation output in response to said temperature signal being indicative of a temperature greater than or approximately equal to a threshold temperature, wherein said microprocessor is operable to allow the blower motor to operate in at least one of a high defrost condition and a low defrost condition irrespective of said temperature signal.

10. A microprocessor-based variable blower controller for use in a climate control system of a vehicle comprising:
- a field effect transistor;
- a temperature sensor in proximity to said field effect transistor and operable to sense a temperature and generate a temperature signal indicative of the temperature; and
- a microprocessor operable to control a blower motor of the climate control system of the vehicle via a pulse width modulation output of said microprocessor, said microprocessor receiving said temperature signal from said temperature sensor, said microprocessor being operable to adjust said pulse width modulation output in response to said temperature signal, said microprocessor receiving at least one input indicative of high and low side voltages of the blower motor and a current applied to the blower motor, said microprocessor being operable to adjust said pulse width modulation output in response to said at least one input, wherein said microprocessor is operable to allow the blower motor to operate in at least one of a high defrost condition and a low defrost condition irrespective of said at least one input and said temperature signal.

11. A microprocessor-based variable blower controller for use in a climate control system of a vehicle comprising:
- a field effect transistor;
- a temperature sensor in proximity to said field effect transistor and operable to sense a temperature and generate a temperature signal indicative of the temperature; and
- a microprocessor operable to control a blower motor of the climate control system of the vehicle via a pulse width modulation output of said microprocessor, said microprocessor receiving said temperature signal from said temperature sensor, said microprocessor being operable to adjust said pulse width modulation output in response to said temperature signal, wherein said microprocessor has an adjustable output performance curve.

12. The microprocessor-based variable blower controller of claim 11, wherein said output performance curve of said microprocessor is adjustable to accommodate at least one of a linear function, a higher-order polynomial function and a combination function.

13. The microprocessor-based variable blower controller of claim 11, wherein said output performance curve of said microprocessor is software driven.

* * * * *

UNITED STATES PATENT AND TRADEMARK OFFICE
CERTIFICATE OF CORRECTION

PATENT NO. : 6,871,126 B2 Page 1 of 1
APPLICATION NO. : 10/427155
DATED : March 22, 2005
INVENTOR(S) : Brian A. Gorman, Sacha E. Barnes and John T. Wichlacz It is certified that error appears in the above-identified patent and that said Letters Patent is hereby corrected as shown below:

<u>Column 4:</u>
Line 23, Claim 1, Insert --field-- before "effect".
Line 31, Claim 1, Insert --field-- before "effect".

Signed and Sealed this

Sixth Day of November, 2007

JON W. DUDAS
*Director of the United States Patent and Trademark Office*